(No Model.)

M. LACRONE & A. K. HAHN.
CASTER.

No. 318,752. Patented May 26, 1885.

Attest:
A. P. Knight
Geo. L. Wheelock

Inventors:
Milton Lacrone
Albert K. Hahn
By Knight Bros.
Attys.

UNITED STATES PATENT OFFICE.

MILTON LACRONE AND ALBERT K. HAHN, OF SPRINGFIELD, OHIO.

CASTER.

SPECIFICATION forming part of Letters Patent No. 318,752, dated May 26, 1885.

Application filed September 15, 1884. (No model.)

*To all whom it may concern:*

Be it known that we, MILTON LACRONE and ALBERT K. HAHN, both of Springfield, Clark county, Ohio, have jointly invented a new and useful Improvement in Furniture-Casters, of which the following is a specification.

Our invention is an improvement in those furniture-casters which have a rubber tire. Such tires are preferably convex at their exterior bearing-surfaces. In our improvement such convexity is secured by a hereinafter-explained conformation of the metallic portion of the wheel, which enables such convex tires to be composed of pieces cut from ordinary rubber tubing, such as can be cheaply obtained and in any desired quantity.

Figure 1:
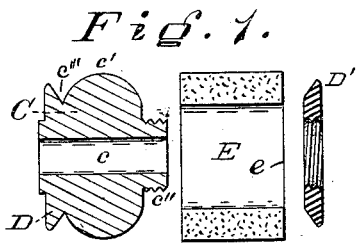
Figure 2:
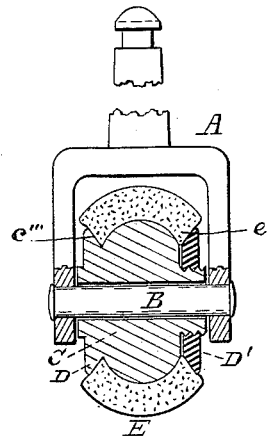
Figure 3:
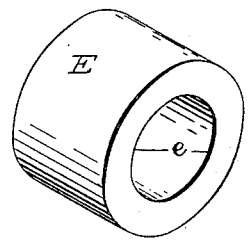
Figure 4:
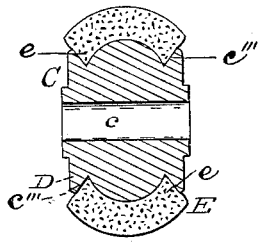

In the accompanying drawings, Figure 1 is an axial section of the parts of our improved caster-wheel separated from one another. Fig. 2 is an axial section of the same parts in position within the bearing-frame. Fig. 3 is a perspective view of a rubber tire detached. Fig. 4 is an axial section of a modification of our invention.

A may represent any customary or suitable bearing-frame of a furniture-caster, and B a suitable axle thereof.

Our improvement relates wholly to the wheel, which is of the following construction:

C is a metallic body having the axial orifice $c$ and the convex periphery $c'$, which on one side is bounded by the integrally-projecting flange D. A screw-threaded boss, $c''$, on the other side of said body, receives the correspondingly screw-threaded detachable flange D'. These flanges D D' are beveled on the inside to form with the sides of the convex periphery V-shaped annular grooves $c'''$.

Before application of the flange D' a cylindrical annulus, E, (which may be cut from a piece of ordinary rubber tubing,) being drawn onto the body C, acquires by this treatment the convex contour shown, having its inner edges, $e$, occupying the V-shaped grooves $c'''$. The flange D' being then screwed to place completes the caster-wheel, as shown in Fig. 2.

The above-described preferred form of our invention may be varied in some particulars. For example, an inferior modification might consist in casting the metallic portion of the caster-wheel in one integral piece, as shown in Fig. 4.

We claim as new and of our invention—

The improved caster-wheel consisting of a body having a convex periphery and V-shaped annular grooves, and a tire formed from a cylindrical annulus of rubber, fitting over the convex periphery and having its inner edges occupying the V-shaped grooves.

In testimony of which invention we hereunto set our hands.

MILTON LACRONE.
    ALBERT K. HAHN.

Attest:
 GEO. H. KNIGHT,
 CHAS. E. PRIOR.